United States Patent
Toyoda

(10) Patent No.: US 8,061,540 B2
(45) Date of Patent: Nov. 22, 2011

(54) MULTI-LAYERED, BLOW MOLDED CONTAINER AND PROCESS FOR MOLDING THE SAME

(75) Inventor: Tamotsu Toyoda, Tokyo (JP)

(73) Assignee: Yoshino Kogyosho Co., Ltd., Tokyo (JP)

( * ) Notice: Subject to any disclaimer, the term of this patent is extended or adjusted under 35 U.S.C. 154(b) by 88 days.

(21) Appl. No.: 12/310,230

(22) PCT Filed: Aug. 9, 2007

(86) PCT No.: PCT/JP2007/065588
§ 371 (c)(1),
(2), (4) Date: Feb. 18, 2009

(87) PCT Pub. No.: WO2008/026437
PCT Pub. Date: Mar. 6, 2008

(65) Prior Publication Data
US 2009/0230074 A1  Sep. 17, 2009

(30) Foreign Application Priority Data

Aug. 31, 2006 (JP) .................... 2006-237013

(51) Int. Cl.
*B65D 1/40* (2006.01)
*B65D 23/00* (2006.01)
*B29C 49/04* (2006.01)

(52) U.S. Cl. ................ 215/12.2; 215/12.1; 264/515

(58) Field of Classification Search ............. 215/12.1, 215/370, 12.2; 264/515
See application file for complete search history.

(56) References Cited

U.S. PATENT DOCUMENTS

| | | | | |
|---|---|---|---|---|
| 3,409,710 A | * | 11/1968 | Klygis | 264/515 |
| 3,457,337 A | * | 7/1969 | Turner | 264/515 |
| 4,079,850 A | * | 3/1978 | Suzuki et al. | 215/12.2 |
| 4,824,618 A | * | 4/1989 | Strum et al. | 264/37.31 |
| 5,927,525 A | * | 7/1999 | Darr et al. | 215/12.2 |
| 6,503,440 B2 | * | 1/2003 | Kuehn et al. | 264/515 |
| 2001/0012550 A1 | * | 8/2001 | Fehn | 428/36.7 |
| 2001/0030163 A1 | * | 10/2001 | Rashid et al. | 215/12.1 |
| 2002/0098310 A1 | | 7/2002 | Kikuchi et al. | |
| 2004/0146675 A1 | * | 7/2004 | Hashimoto et al. | 428/35.7 |
| 2005/0230419 A1 | * | 10/2005 | Safian | 222/105 |
| 2007/0178266 A1 | * | 8/2007 | Dey | 428/35.7 |

FOREIGN PATENT DOCUMENTS

| | | |
|---|---|---|
| JP | A-5-338638 | 12/1993 |
| JP | A-10-128836 | 5/1998 |
| JP | A-2002-103428 | 4/2002 |
| JP | A-2003-39531 | 2/2003 |
| JP | A-2003-71911 | 3/2003 |

* cited by examiner

*Primary Examiner* — Sue Weaver
(74) *Attorney, Agent, or Firm* — Oliff & Berridge, PLC

(57) ABSTRACT

This invention is aimed at preventing containers effectively from performance deterioration, such as exposure of the recycled material at the neck and reduced strength of the pinch-off portion, as caused by a high ratio of recycled material used as the middle layer. There is provided a multi-layered blow-molded container molded from cylindrical multi-layered parison, wall of the container comprising at least an outer layer, an inner layer, and a middle layer, wherein the outer and inner layers are made of a same synthetic resin, while the middle layer is made of a recycled material consisting primarily of the synthetic resin used for the outer and inner layers. This container is characterized in that it has either middle-layer excluded zones or a thin middle-layer zone. These zones are provided at a predetermined range along the direction in which the parison is extruded.

5 Claims, 4 Drawing Sheets

[Fig.1]
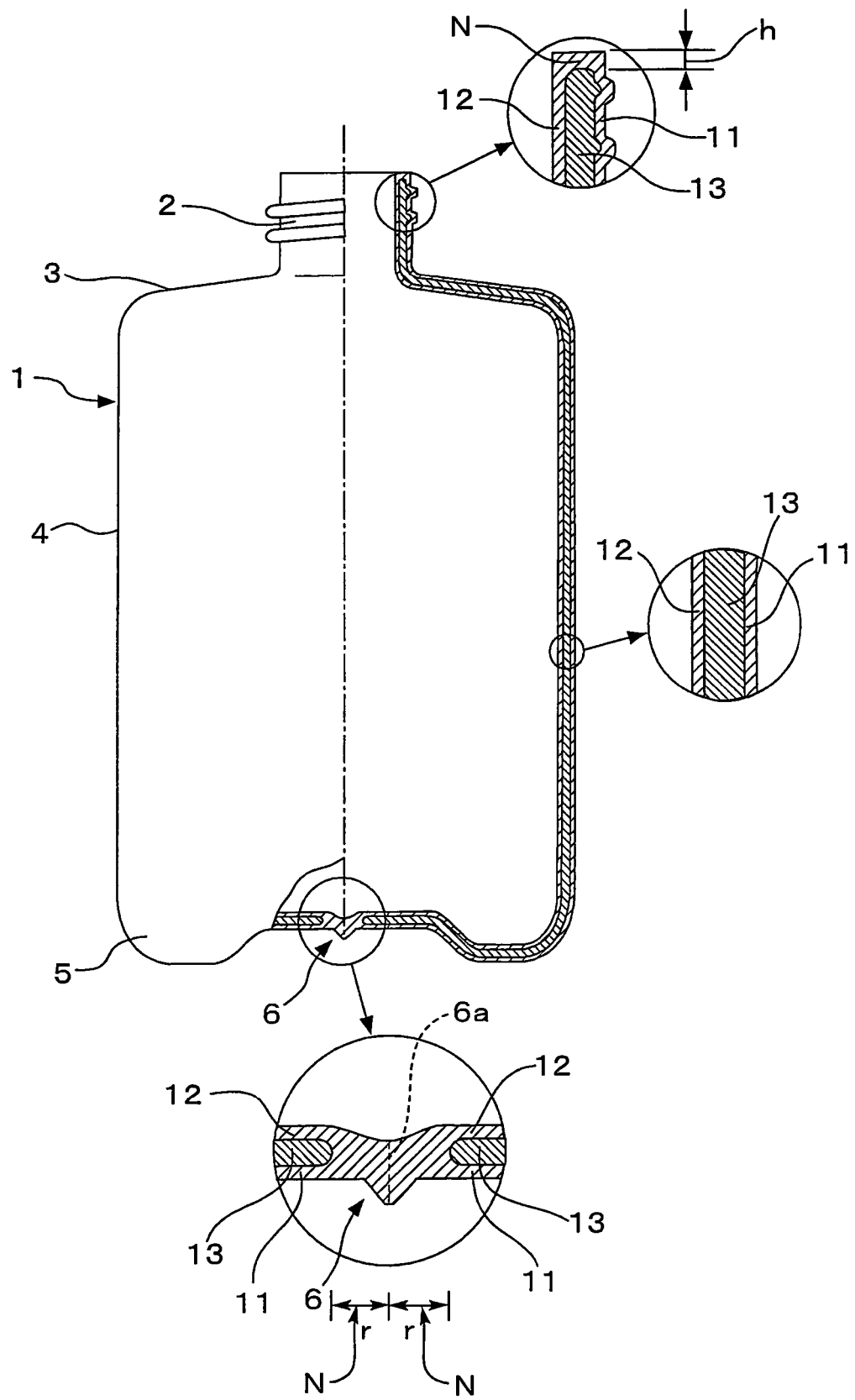

[Fig.2]
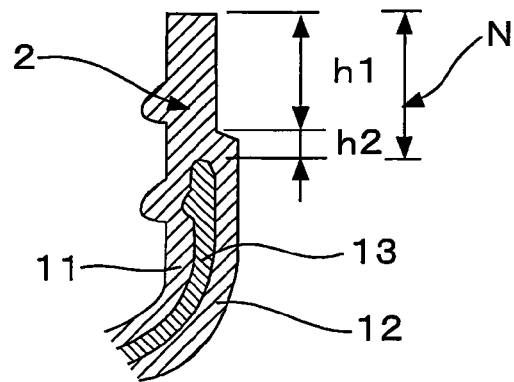
(a)
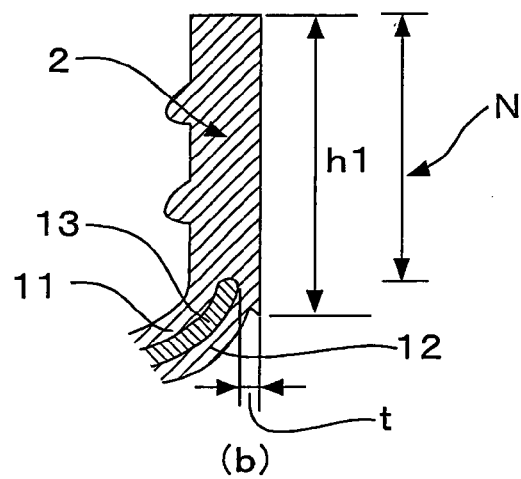
(b)
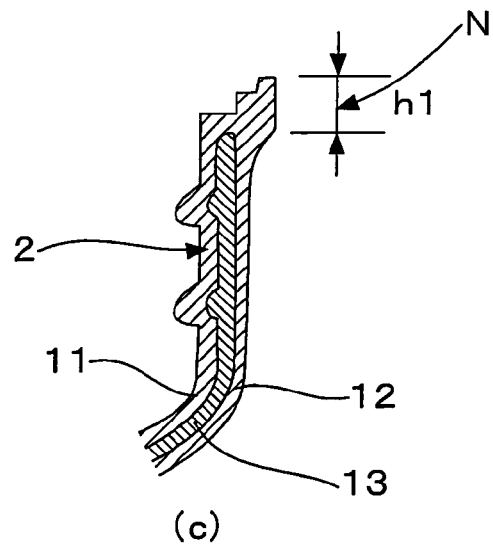
(c)

Conventional Art

[Fig.5]
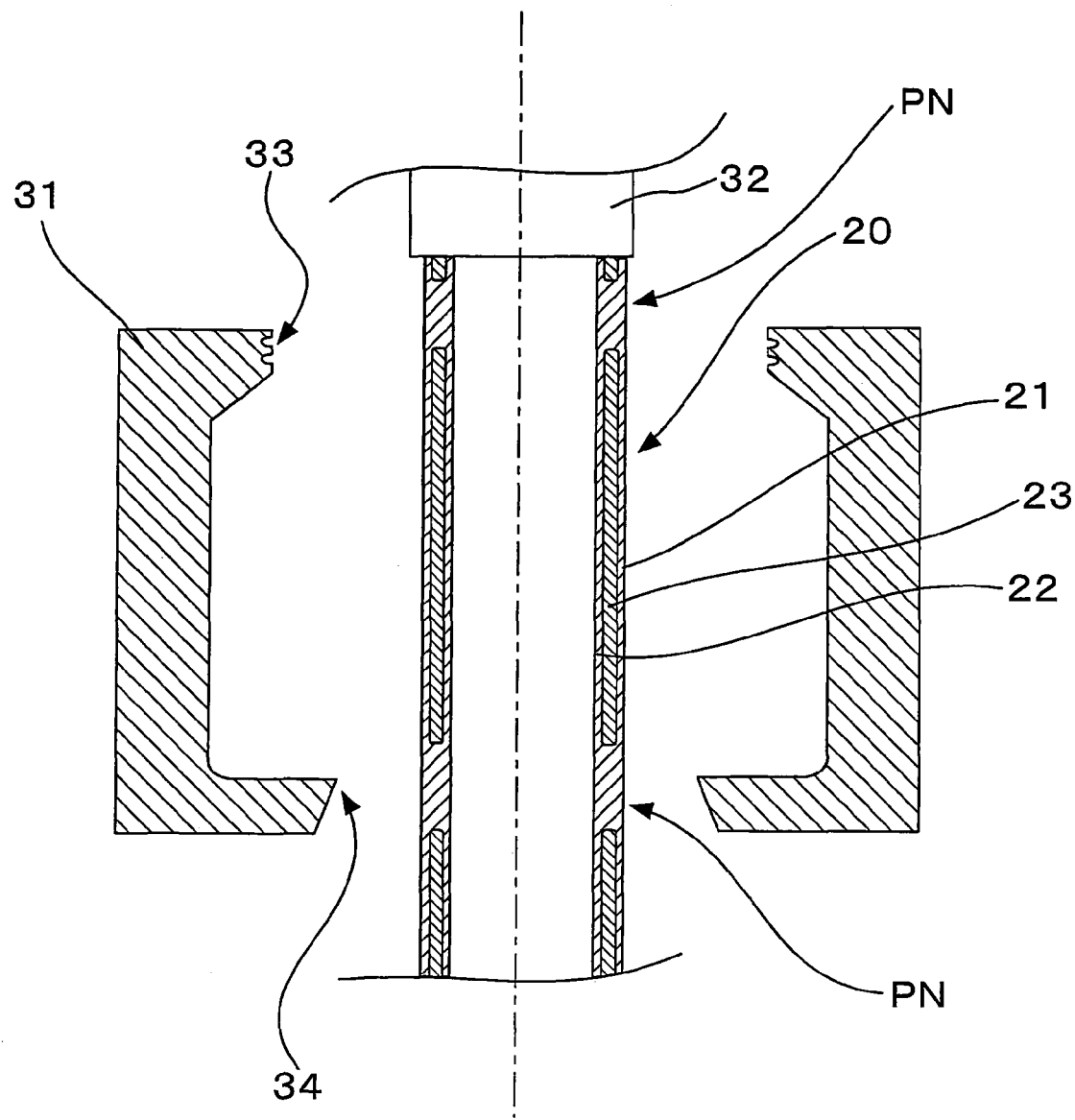

US 8,061,540 B2

MULTI-LAYERED, BLOW MOLDED CONTAINER AND PROCESS FOR MOLDING THE SAME

TECHNICAL FIELD

This invention relates to a multi-layered, blow molded container made of synthetic resins and formed by a direct blow molding process utilizing a recycled material for a middle layer.

BACKGROUND ART

Patent Document 1, for example, discloses a multi-layered blow molded plastic bottle utilizing a recycled material for the middle layer. Patent Document 2 discloses a die for use in blow molding multi-layered bottles, such as the one described in Patent Document 1. Traditionally, it is a widespread practice, from cost-reduction and resources-saving points of view, to collect flash and defective products occurring from production processes and to utilize regenerated materials or so-called recycled materials as the materials for the middle layer of multi-layered containers.

[Patent Document 1] Published patent application JP1993-338638
[Patent Document 2] Published patent application JP1998-128836

DISCLOSURE OF THE INVENTION

Problems to be Solved by the Invention

In many cases, a virgin material of the same synthetic resin is utilized for the outer layer and the inner layer of multi-layered blow molded containers of this type. On the other hand, a recycled material consisting primarily of the synthetic resin used for the outer and inner layers is usually utilized for the middle layer. From the cost reduction and resources saving points of view, it is necessary to increase the thickness of the middle layer so as to increase the rate of the recycled material to be used as the middle layer. On the other hand, the recycled material has problems of decreased mechanical properties and moldability because of oxidization and deterioration caused by high-temperature thermal history and also because of contamination of other resins. In addition, decreased adhesiveness between the middle layer and the outer/inner layers is also related with the decreased mechanical properties and moldability. Furthermore, the middle layer is required not to come in direct contact with the contents because a serious problem arises if the contents are affected by the middle layer of those containers used for foods and drinks.

Cylindrical multi-layered parison is extrusion molded in a direct blow molding process, and is cut at both of upper and lower ends. At that time, the middle layer is directly exposed outside at the upper and lower ends of the blow molded container, i.e., at an upper end face of a neck and at a pinch-off portion of a bottom. Especially, the exposure of the middle layer at the upper end face of the neck poses a large problem on the containers used for foods and drinks.

The vicinity of the upper end face of the neck is an area where high dimensional precision is required because this area has to be tightly sealed by a cap. At the bottom end, the parison is flattened, and the molten flat edges are adhered to each other to form the pinch-off portion, which tends to be cracked by, for example, an impact of fall. Thus, the existence of the middle layer incurs a problem that the neck seal ability and the pinch-off strength are inevitably reduced This invention has been made to solve the above problems experienced in prior art. The technical problem of this invention is to prevent containers effectively from performance deterioration, such as exposure of the recycled material at the neck, reduction in the strength of the pinch-off portion, and the like, which are caused by an increase in the amount of recycled material to be used as the middle layer.

Means of Solving the Problems

The means to solve the above-described technical problems is a multi-layered blow-molded container molded by blow molding cylindrical multi-layered parison that has been extrusion molded. The multi-layered blow molded container has a neck, a shoulder, a body, a bottom, and a container wall comprising at least an outer layer, an inner layer, and a middle layer, wherein the outer and inner layers are made of a same synthetic resin, while the middle layer is made of a recycled material consisting primarily of the synthetic resin used for the outer and inner layers. The multi-layered blow molded container is characterized in that the container has either middle-layer excluded zones where there is no middle layer, or a thin middle-layer zone where the middle layer is made thinner than in other portions of the wall. These middle-layer excluded zones or thin middle-layer zones are provided at a predetermined range along the direction in which the parison is extruded.

An upper-end portion of the neck and/or a bottom portion are/is where container performance may have deterioration caused by the existence of the middle layer. Under the above construction, this deterioration can be effectively prevented when these portions are provided with middle-layer excluded zones having no middle layer or thin middle-layer zones having a thinner middle layer than in other portions of the wall. These middle-layer excluded zones or thin middle-layer zones should be formed only in limited ranges. For the rest of the container wall, the middle layer made of the recycled material would have a sufficient wall thickness. On the whole, the container can maintain a high level of usage rate for the recycled material.

The middle-layer excluded zones or thin middle-layer zones are formed at first in parison by blocking the flow or reducing the flow rate, with predetermined timing, of the synthetic resin flowing through the middle-layer channel, and are formed in a given height range, i.e., within a given range along the parison in the direction in which the parison is extruded. These zones are then laid out in the container by blow molding the multi-layered parison, as will be described later. From this point of view, the middle-layer excluded zones or thin middle-layer zones of the container are described as "These middle-layer excluded zones or thin middle-layer zones are provided at a predetermined range along the direction in which the parison is extruded." This 'predetermined range along the direction in which the parison is extruded' corresponds to "a given height range" as far as the neck, the shoulder, or the body of the container is concerned. In the case of an underside of the bottom, the 'range' corresponds to "a given range in the direction perpendicular to a welded plane formed in a pinch-off operation."

The middle-layer excluded zones or thin middle-layer zones are not limited to one place, but can be formed in more than one place, for example, in two places including the upper end of the neck and the vicinity of the bottom pinch-off portion. Which of the middle-layer excluded zone or the thin middle-layer zone is used can be determined by giving consideration primarily to the magnitude of effect which the existence of the middle layer has on the decrease in container performance, and further by taking moldability into consideration. For example, the containers for use in foods and drinks are required to have a middle-layer excluded zone at the upper end of the neck. If, in the case of the pinch-off portion, a different resin is used in a minor amount and causes no remarkable decrease in the adhesive property of the middle layer adhered to the outer and inner layers, then it is advantageous to use the thin middle-layer zone so that the rate of usage in the amount of the middle layer can be increased.

The means of carrying out another embodiment comprises that, the thin middle-layer zones are provided as gradated zones associated with wall thickness, in which the thickness of the middle layer has been gradually reduced.

If there is a large difference in the physical properties between a virgin material and a recycled material, sudden disconnection of the middle layer conducted in the case of the middle-layer excluded zone or rapid stepwise reduction in the thickness conducted for the thin middle-layer zone may create problems such as uneven appearance in the portions concerned, decreased dimensional precision, and/or decreased blow moldability. Under the above construction these problems can be controlled by providing the thin middle-layer zones as graded zones in which the thickness of the middle layer is gradually reduced. Furthermore, for the control of these problems, the middle-layer excluded zones may be formed in such a way that the gradated zones are disposed on both sides of each middle-layer excluded zone.

The means of carrying out another embodiment comprises that, a given height range down from the top end face of the neck is set aside for a middle-layer excluded zone.

Under the above construction the container can be safely used in the field of foods and drinks because the middle layer made of a recycled material is not exposed outside at the upper end face of the neck.

In addition, dimensional precision can be increased at the end portion of the neck including the top end face, while eliminating the effect of the middle layer. The sealing with a cap can be maintained favorably. If the neck is trim-finished by grinding the neck with a drill in a post-processing operation to get a high level of seal, it is possible to eliminate fluff that develops when a different polymer gets mixed in the recycled material.

The means of carrying out another embodiment comprises that, the middle-layer excluded zone has a height range of 2 mm or more.

Under the above construction, the middle-layer excluded zone is set at a height range of 2 mm or more. At this height, surface sinks can be prevented from occurring on the top end face of the neck, and a cutting stock for trimming can be fully secured. Although there is some decrease in the rate of usage for the recycled material, it is preferred that the middle-layer excluded zone has a height range of 5 mm or more in view of the sink control and considering that the cutoff of resin flow through the middle-layer channel is easy to control at the time of parison molding.

The means of carrying out another embodiment comprises that, a middle-layer excluded zone is provided in the vicinity of the bottom pinch-off portion.

Under the above construction, there is no middle layer existing in the vicinity of the pinch-off portion which has been obtained by flattening the cylindrical parison at an end and thermally welding and sealing this end portion. Since the pinch-off portion has only the outer and inner layers made of a virgin material, this portion has as much strength as a single-layer blow molded container has.

The means of carrying out the above embodiment comprises that, a middle-layer excluded zone is formed in the pinch-off portion as far as at least 5 mm from the welded plane.

Under the above construction a middle-layer excluded zone is formed as far as at least 5 mm and preferably 10 mm from the welded plane. Thus, it is possible to eliminate the effect of the middle layer on the strength of the pinch-off portion.

The means of carrying out another embodiment comprises that, a thin middle-layer zone is provided in the vicinity of the bottom pinch-off portion.

Under the construction, the middle-layer excluded zone does not always have to be provided in the vicinity of the pinch-off portion, but the bottom strength can be fully secured by providing a thin middle-layer zone, in the case where only a small amount of another resin is mixed in the recycled material and where there is no large decrease in adhesiveness of the middle layer with the outer and inner layers.

The means of carrying out the above embodiment comprises that, the thin middle-layer zone is provided as far as at least 10 mm from the welded plane of the pinch-off portion.

Under the above construction, the thin middle-layer zone is formed as far as at least 10 mm, and more preferably 15 mm or more, from the welded plane of the pinch-off portion. Thus, it is possible to eliminate fully the effect of the middle layer on the strength of the pinch-off portion and to widen the limits to the tolerance level associated with alignment of the thin middle-layer zone. Thus, the parison can be molded, and the containers can be blow molded, while staying on the safe side.

The means of carrying out another embodiment comprises that, a thickness-based component ratio of the middle layer is set 0.5 or less for the vicinity of the welded plane of the thin middle-layer zone.

Under the above construction, the effect of the middle layer on the strength of the pinch-off portion can be controlled. In the case where a different resin is mixed in a large amount, it is preferred to make this component ratio of the middle layer further smaller.

The means of carrying out the above-described embodiments comprises that, a thickness-based component ratio of the middle layer is set in a range of 0.3 to 0.9 for the portions other than the middle-layer excluded zones or thin middle-layer zones.

Under the above construction of these embodiments, the rate of the recycled material to be used as the middle layer can be increased when a thickness-based component ratio of the middle layer is set at 0.3 or more for the portions other than the middle-layer excluded zones and the thin middle-layer zones. In addition, if this ratio is kept under 0.9, the middle layer can be reliably covered with the outer and inner layers without giving damage to blow moldability.

The invention according to another embodiment relates to a process for molding the multi-layered blow molded container of the invention according to the embodiments described above. The process comprises the following three features (1), (2), and (3):

Use (1) Use is made of a die for extrusion molding multi-layered parison. This die comprises three channels for forming cylindrical layers, which include an inner-layer channel, a middle-layer channel, and an outer-layer channel in this order starting from inside. The die also comprises a confluence channel located downstream of the three layer-forming channels by way of a point of confluence.

(2) The inner- and outer-layer channels are supplied with the same synthetic resin, and the middle-layer channel is supplied with a recycled material consisting primarily of the same synthetic resin that is supplied to the inner- and outer-layer channels. The synthetic resin flow through the middle-layer channel is blocked, or the flow rate is reduced, with predetermined timing. In this way, the middle-layer excluded zones having no middle layer in a predetermined height range or the thin middle-layer zones having a thin middle layer are formed in the multi-layered parison, which is extrusion molded.

(3) The parison thus obtained is then pinched off to form a closed lower end, and air is blown through the opening at the upper end to blow mold the multi-layered blow molded container having middle-layer excluded zones in which there is no middle layer or a thin middle-layer zone having a thin middle layer.

According to the above-described process, each resin is directly supplied from an extruder or by way of an accumulator in a molten state, and is passed through a feed channel, and is sent into each layer-forming channel. The middle-layer flow is blocked, or its flow rate is controlled, by a valve mechanism, such as a ball valve, a sprue valve, and the like, or by a shutter mechanism, which are disposed along each feed channel, and/or by the extruder, the accumulator, and the like, whereby the discharge pressure is adjusted. The layer thickness can also be changed in a gradated manner. It should be noted here that the methods of blocking the flow of the middle layer or of adjusting the flow rate are not limited to the above-described means, but that a wide variety of means used in the past can also be applied.

Effects of the Invention

This invention having above construction has the following effects:

According to one embodiment, there are provided the middle-layer excluded zones where there is no middle layer or thin middle-layer zones where the middle layer is provided as a thin layer. These zones are disposed in given ranges of the portions where container performance may decrease due to the existence of the middle layer. This construction effectively prevents the containers from undergoing deterioration caused by the utilization of the recycled material, and allows the recycled material to be used at a high rate.

According to another embodiment, the thin middle-layer zones are provided as gradated zones in which the thickness of the middle layer has been gradually reduced. The gradated zones ease up the problem of deformation caused by a rapid stepwise change in the thickness of the middle layer or the problem of uneven blow moldability.

According to another embodiment, a given height range down from the top end face of the neck is set aside for a middle-layer excluded zone. Because of this zone, the container can be safely used in the field of foods and drinks even after the trimming of the neck, without any concern for the exposure of the recycled material at the upper end face of the neck.

According to another embodiment, the middle-layer excluded zones have a height range of 2 mm or more and preferably 5 mm or more. In this way, the top end face of the neck can be protected against sinks, and a cutting stock for trimming can be fully secured for this part of the neck.

According to another embodiment, a middle-layer excluded zone is formed in the vicinity of the bottom pinch-off portion. Because of this middle-layer excluded zone, there is no middle layer in the vicinity of the pinch-off portion where the cylindrical parison has been flattened and thermally welded. Therefore, it is possible to prevent effectively the decrease in strength of the pinch-off portion that occurs inevitably with the utilization of a recycled material.

According to another embodiment, the influence of the middle layer on the strength of the pinch-off portion can be eliminated by setting a middle-layer excluded zone as far as at least 5 mm and more preferably 10 mm from the welded plane.

According to another embodiment, the middle-layer excluded zone cannot always have to be formed in the vicinity of the pinch-off portion, but it is enough to form a thin middle-layer zone to prevent effectively the decrease in the strength of the pinch-off portion that occurs inevitably with the utilization of a recycled material.

According to another embodiment, a thin middle-layer zone is formed as far as at least 5 mm and more preferably 10 mm from the welded plane. Such a thin middle-layer zone serves to eliminate the influence of the middle layer on the strength of the pinch-off portion satisfactorily, to widen the tolerance associated with the alignment of the thin middle-layer zone at the molding time, and to mold the parison and blow mold the container while keening on the safe side.

According to another embodiment, the influence of the middle layer on the strength of the pinch-off portion can be curbed by setting a thickness-based component ratio of the middle layer at 0.5 or less for the vicinity of the welded plane of the thin middle-layer zone.

According to another embodiment, the rate of the recycled material to be used as the middle layer can be increased when a thickness-based component ratio of the middle layer is set at 0.3 or more for the portions other than the middle-layer excluded zones and the thin middle-layer zones. In addition, if this ratio is kept under 0.9 to secure the thickness of outer and inner layers, the middle layer can be reliably covered with the outer and inner layers without giving damage to blow moldability.

Another embodiment relates to a process for molding the multi-layered blow molded container of this invention. The middle-layer excluded zones having no middle layer or the thin middle-layer zones where the middle layer is provided as a thin layer can be formed by controlling a valve disposed along the feed channel or by adjusting the discharge pressure of an extruder or an accumulator. The parison having such a middle-layer excluded zone and/or a thin middle-layer zone is pinched off under the condition that the parison is set at a position opposed to a given height of a blow mold, and then is blow molded into the container described in the above embodiments.

BRIEF DESCRIPTION OF THE DRAWINGS

FIG. 1 is a front elevational view of the container in one embodiment of this invention, along with partially enlarged vertical sections.

FIGS. 2a, 2b, and 2c are explanatory diagrams showing three neck examples in vertical sections.

FIG. 5 is an outlined explanatory diagram showing an example of the molding process of this invention.

DESCRIPTION OF CODES

Figure 3:
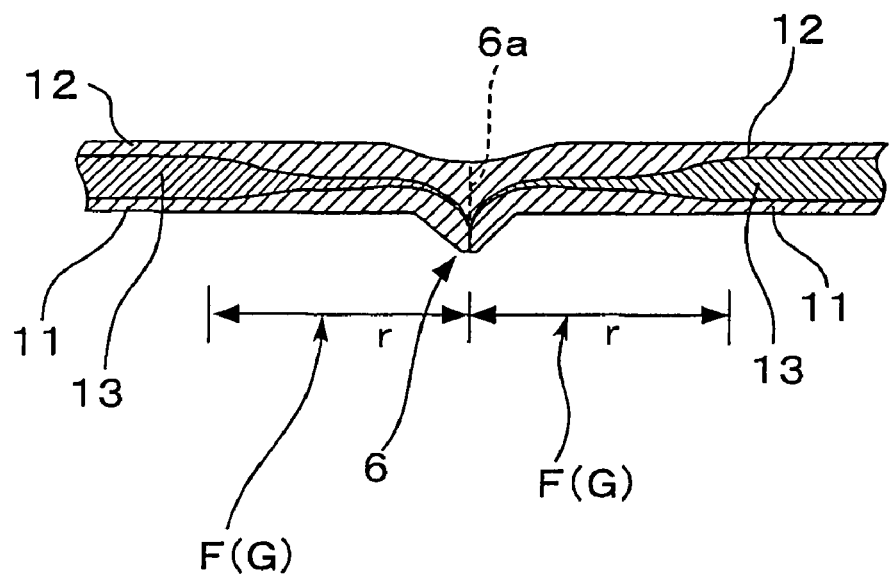
FIG. 3 is an explanatory diagram showing another layer construction in a vertical section in the vicinity of the pinch-off portion.

1. Container
2. Neck
3. Shoulder
4. Body
5. Bottom
6. Pinch-off portion
6a. Welded plane
11. Outer layer
12. Inner layer
13. Middle layer
20. Parison
21. Outer layer
22. Inner layer
23. Middle layer
31. Split mold
32. die
33. Mouth
34. Pinch-off section of the mold
N. Middle-layer excluded zone
F. Thin middle-layer zone
G. Gradated zone
PN. Middle-layer excluded zone of the parison
h, h1; h2. Height range
t. Thickness
r. Range

PREFERRED EMBODIMENTS OF THE INVENTION

This invention is further described with respect to preferred embodiments, now referring to the drawings. FIG. 1 is a front elevational view of the multi-layered blow molded container in one embodiment of this invention, along with partially enlarged vertical sections. The container 1 is a bottle having a cylindrical neck 2, a shoulder 3, a body 4, and a bottom 5. The wall of the container 1 comprises an outer layer 11, an inner layer 12, and a middle layer 13. The outer layer 11 and the inner layer 12 are made of a high-density polyethylene resin. The middle layer 13 is made of a recycled material consisting primarily of the high-density polyethylene resin, with a different resin, such as a nylon resin, being incorporated in a small amount.

For the portions other than the top front end of the neck 2 and the pinch-off portion 6 of the bottom 5, the thickness-based component ratio among the outer layer 11, the middle layer 13, and the inner layer 12 is 0.15:0.7:0.15 on an average. As shown in partially enlarged vertical sections in FIG. 1, there is a middle-layer excluded zone N having no middle layer 13 at the front end face of the neck 2, and another one in the vicinity of the bottom pinch-off portion 6.

In the case of this embodiment, the middle-layer excluded zone N at the upper end of the neck 2 has a height range of 3 mm. The top end face of the neck is flat, and the cap is screwed on the neck 2 by using this top end face as the seal face to obtain the seal performance that is sufficient for ordinary application.

If the container is utilized for an application requiring high seal performance, as in the case where inside of the container is pressurized to a large degree, the top end face is trim-finished by grinding the face with a trimmer in the post-treatment. With the middle-layer excluded zone N having a height range of about 3 mm, there is no chance that the middle layer 13 is exposed by the grinding of the top end face. Thus, trim finish can be safely carried out, and the containers can be used in the field of foods and drinks. The height range of 3 mm is set for the middle-layer excluded zone at the upper end of the neck 2 in this embodiment. From a point of view of the middle layer 13 which may be exposed in the post-treatment, the middle-layer excluded zone N is required to have a height range of 2 mm or more.

FIG. 2(a, b, c) are explanatory diagrams showing three vertical sections of the neck 2 in other embodiments. The first embodiment described above shows the neck 2 of a so-called top seal face type using the top end face as the seal face. The neck 2 is not limited to the top seal face type, but is in various shapes and seal types, combined with caps or inside plugs. Therefore, it is necessary to set a height range of the middle-layer excluded zone N in response to the types to be used for respective purposes.

FIG. 2(a) shows the neck 2 of a type in which the inner wall of the neck 2 is trim-finished with a drill within a height range h1 of the top end portion. In this case, the middle-layer excluded zone N is formed to further include a height range h2 extending downward from the lower end of the height range h. FIG. 2(b) shows the neck 2 of a type in which the inner wall of the neck 2 is trim-finished over the entire height range h1. The middle-layer excluded zone N is as high as the almost entire height of the neck 2. In this case, a thickness, t, of 2 mm or more should be taken in view of a cutting stock in the radial direction.

FIG. 2(c) shows the neck 2 in which the diameter of the mouth opening is narrowed at the tope end. The inner wall of the neck 2 is trim-finished for a sealing purpose within the height range h1 of the narrow mouth portion.

In the first embodiment, the range, r, of the middle-layer excluded zone, N, in the vicinity of the pinch-off portion 6 of the bottom 5 is set at about 10 mm from the welded plane 6a respectively to the right and the left. Since there is no middle layer 13 in the vicinity of the welded face 6a, high strength is obtained for the pinch-off portion without being affected by the middle layer 13 (See an enlarged vertical section in the vicinity of the pinch-off portion 6 in FIG. 1).

Each range, r, of about 10 mm from the welded plane 6a respectively to the right and the left is used in the first embodiment. There must be a range of at least 5 mm if consideration is given to the effect of the middle layer 13 on the strength of the pinch-off portion 6 and the alignment of parison with the mold pinch-off section in the later-described blow molding.

FIG. 3 is an explanatory diagram showing in a vertical section another embodiment of layer structure in the vicinity of the pinch-off portion 6. In this embodiment, a thin middle-layer zone, F, is provided in the vicinity of the pinch-off portion 6 instead of the middle-layer excluded zone. This thin middle-layer zone, F, has a gradated zone, G, in which the thickness of the middle layer 13 is gradually reduced. As shown in FIG. 3, the thin middle-layer zone, F, can extend on either side of the pinch-off portion 6 to a flat bottom wall portion of the bottom 5. Since, in the case of the pinch-off portion 6, there is no chance that the middle layer 13 comes in direct contact with foods, the pinch-off portion 6 can have such a layer structure having the middle layer 13 to the limit in which the strength of the pinch-off portion 6 is secured.

At the time when multi-layered parison is extrusion molded, such 6 gradated zones can be formed relatively easily without requiring shut-down of the middle layer flow or fast adjustment of the flow rate. This is advantageous from a productivity point of view. The middle layer 13 can be made quite thin in the vicinity of the welded plane 6a, and this, too, is advantageous for the strength of the pinch-off portion 6.

In the embodiment shown in FIG. 3, the thin middle-layer zone F (or the gradated zone G) is disposed in a range, r, of 20 mm from the welded plane 6a, and the thickness-based component ratio of the middle layer 13 within this range is set at 0.3 on the average. Considering the strength of the pinch-off portion 6 and the moldability of the thin middle-layer zone F, preferably the thin middle-layer zone F has a range, r, of at least 10 mm and more preferably 15 mm or more. The component ratio of the middle layer 13 is required to be 0.5 or less.

Figure 4:
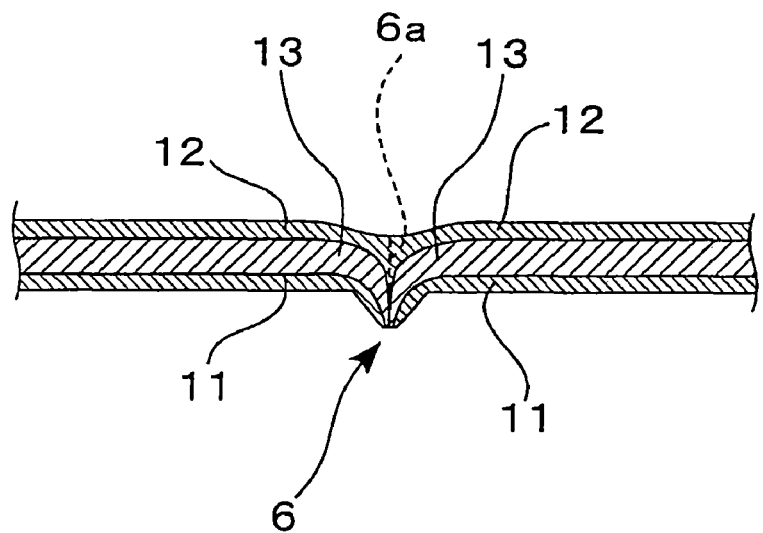
FIG. 4 is an explanatory diagram showing layer construction of a conventional container in a vertical section in the vicinity of the pinch-off portion.

FIG. 4 is an explanatory diagram showing a layer structure in the vicinity of the pinch-off portion 6 found in a conventional container. Since the pinch-off portion 6 is an area where parison has been flattened, pressed, and welded, there remains large residual strain. After the container has been molded, relatively large internal stress continues to act on the container. If the container falls accidentally, large force acts on this portion so as to peel off the welded plane 6a.

In the conventional example shown in FIG. 4, a thick middle layer 13 has a thickness-based component ratio of about 0.7. This middle layer 13 is disposed next to the welded plane 6a which has been formed by welding the inner layers 12 on both sides. If the middle layer 13 has low adhesiveness with the inner layers 12 due to oxidative deterioration or incorporation of a different resin, there may occur accidental peeling at the interfaces between the middle layer 13 and the inner layers 12, and a subsequent decrease in the strength of the pinch-off portion 6, when force acts on this part as a result of above-described internal stress or fall of the container.

FIG. 5 is a simple explanatory diagram showing an example of the molding process of this invention for molding the container 1 of FIG. 1. It shows that multi-layered cylindrical parison 20 is extruded from a multi-layer extrusion molding die 32 into a space between open split mold halves 31 for blow molding use.

This multi-layered parison 20 comprises an outer layer 21 and an inner layer 22 made of a high-density polyethylene resin and a middle layer 23 made of a recycled material consisting primarily of the high-density polyethylene resin. The parison is provided with two middle-layer excluded zones PN at two positions. These zones are disposed at positions respectively facing mouth 33 of a split mold 31 and the pinch-off section 34 of the split mold 31. Under this condition, the split mold halves are closed, and after the lower middle-layer excluded zone PN has been pinched off by the mold pinch-off section 34, air is blown into the parison through the upper opening to mold the container 1 shown in FIG. 1, in which the middle-layer excluded zones PN are formed at the upper end of the neck 2 and in the vicinity of the bottom pinch-off portion 6.

This parison 20 is formed by using three channels for forming cylindrical layers, which include an inner-layer channel, a middle-layer channel, and an outer-layer channel in this order starting from inside, and also a die for extrusion molding multi-layered containers, which comprises a confluence channel located downstream of the three layer-forming channels by way of a point of confluence. The middle-layer excluded zones PN of parison can be formed at positions facing the mouth 33 and the pinch-off section 34 of the above-described split mold 31, by using a valve mechanism or a shutter mechanism to block the synthetic resin flow through the middle-layer channel with predetermined timing.

Thin middle-layer zones having the middle layer 23 made thin in a given height range of the multi-layered parison 20 can be formed by controlling the aperture of the valve or shutter mechanism with predetermined timing, or by adjusting the discharge pressure of the extruder, accumulator, and the like. Furthermore, this thin middle-layer zone can also be formed as a gradated zone where the thickness of the middle layer 23 is gradually reduced.

This invention has been described with respect to preferred embodiments. However, the actions and effects of this invention are not limited to these embodiments. For instance, the synthetic resin to be used is not limited to the high-density polyethylene, but use can be made of any resins which have been used in blow molding of prior art. If necessary, another middle layer, such as a layer having high gas barrier properties, can also be laminated.

INDUSTRIAL APPLICABILITY

The multi-layered blow molded container of this invention has been described above. This invention allows recycled materials to be used at a high rate without being concerned with the exposure of the recycled material at the neck and a decrease in the strength of the pinch-off portion, which are the problems involved in the utilization of recycled materials. Thus, the container of this invention can be utilized in various fields from the points of view of cost reduction and resource saving.

The invention claimed is:

1. A multi-layered blow-molded container molded by blow molding a cylindrical multi-layered parison that has been extrusion molded, the multi-layered blow molded container comprising:
   a neck, a shoulder, a body, a bottom, and a container wall comprising at least an outer layer, an inner layer, and a middle layer; and
   a thin middle-layer zone in an area where the middle layer is made thinner than in other portions of the wall, the thin middle-layer zone being provided at a vicinity of a pinch-off portion of the bottom that includes the pinch-off along a direction in which the parison is extruded,
   wherein the outer and inner layers are made of a same synthetic resin, and the middle layer is made of a recycled material consisting primarily of the synthetic resin used for the outer and inner layers, and
   the thin middle-layer zone extends on either side of the pinch-off portion to a flat wall portion at the bottom of the container.

2. The multi-layered blow-molded container according to claim 1, wherein the thin middle-layer zone is formed as a gradated zone associated with a middle-layer thickness, in which the middle-layer thickness is gradually reduced.

3. The multi-layered blow-molded container according to claim 1, wherein the thin middle-layer zone is formed at least 10 mm from a welded plane of the pinch-off portion.

4. The multi-layered blow-molded container according to claim 1, wherein
   a thickness-based component ratio of the middle layer to a total thickness is set to 0.5 or less on average at the thin middle-layer zone.

5. A process for molding a multi-layered blow molded container having a neck, a shoulder, a bottom and a body, the process comprising:
   (1) utilizing a die for extrusion molding a multi-layered parison, the die comprising three channels for forming cylindrical layers, which include an inner-layer channel, a middle-layer channel, and an outer-layer channel in this order starting from an inside of the container, and also comprising a confluence channel located downstream of the three layer-forming channels by way of a point of confluence;
   (2) supplying the inner- and outer-layer channels with a same synthetic resin, and supplying the middle-layer channel with a recycled material consisting primarily of the same synthetic resin that is supplied to the inner- and outer-layer channels, blocking synthetic resin flow through the middle-layer channel, or reducing the flow rate, with predetermined timing, and extrusion molding the multi-layered parison having a thin middle-layer zone having a thin middle layer in a predetermined height; and (3) pinching off thus-obtained parison at the thin middle-layer zone to form a closed lower end, and blowing air through the opening at the upper end to blow mold the multi-layered blow molded container having the thin middle-layer zone at a vicinity of a pinch-off portion of the bottom and extending on either side of the pinch-off portion to a flat wall portion at the bottom of the container.

* * * * *